(12) United States Patent  (10) Patent No.:  US 7,735,774 B2
Lugg  (45) Date of Patent:  Jun. 15, 2010

(54) VTOL AIRCRAFT WITH FORWARD-SWEPT FIXED WING

(75) Inventor: Richard H. Lugg, Falmouth, ME (US)

(73) Assignee: Sonic Blue Aerospace, Inc., Portland, ME (US)

( * ) Notice: Subject to any disclaimer, the term of this patent is extended or adjusted under 35 U.S.C. 154(b) by 562 days.

(21) Appl. No.: 11/720,532

(22) PCT Filed: Dec. 2, 2005

(86) PCT No.: PCT/US2005/043564

§ 371 (c)(1),
(2), (4) Date: May 31, 2007

(87) PCT Pub. No.: WO2006/073634

PCT Pub. Date: Jul. 13, 2006

(65) Prior Publication Data

US 2009/0127379 A1  May 21, 2009

Related U.S. Application Data

(60) Provisional application No. 60/632,616, filed on Dec. 2, 2004.

(51) Int. Cl.
*B64C 15/02* (2006.01)
(52) U.S. Cl. ............... 244/12.3; 244/12.1; 244/12.2; 244/12.4; 244/12.5; 244/45 A; 244/45 R; D12/319; D12/341; D12/342; D12/337; D12/331; D12/332
(58) Field of Classification Search ............... 244/12.1, 244/12.2, 12.3, 12.4, 12.5, 45 A, 45 R, 55; D12/319, 341, 337, 331, 332, 342
See application file for complete search history.

(56) References Cited

U.S. PATENT DOCUMENTS

| 3,120,362 | A |   | 2/1964  | Curtis at al.            |
|-----------|---|---|---------|--------------------------|
| 3,155,342 | A | * | 11/1964 | Bolkow et al. ............. 244/12.5 |
| 3,278,138 | A | * | 10/1966 | Haberkorn ................. 244/12.3 |
| 3,388,878 | A | * | 6/1968  | Peterson et al. ........... 244/23 B |
| 3,499,620 | A | * | 3/1970  | Sturm et al. ................... 244/55 |
| 3,618,875 | A | * | 11/1971 | Kappus ..................... 244/12.3 |
| 3,942,746 | A | * | 3/1976  | Carter et al. .................. 244/13 |
| 4,125,232 | A | * | 11/1978 | MacLean et al. ........... 244/12.3 |
| 4,336,913 | A | * | 6/1982  | Hall ......................... 244/45 R |
| D268,107  | S | * | 3/1983  | Enav et al. ................. D12/331 |
| 4,417,708 | A | * | 11/1983 | Negri ........................ 244/45 R |
| 4,469,294 | A | * | 9/1984  | Clifton ...................... 244/12.3 |
| 4,562,546 | A | * | 12/1985 | Wykes et al. ................... 701/4 |
| 4,767,083 | A | * | 8/1988  | Koenig et al. .............. 244/12.3 |
| 4,828,203 | A | * | 5/1989  | Clifton et al. .............. 244/12.3 |
| D304,831  | S | * | 11/1989 | Ratony ..................... D12/331 |

(Continued)

*Primary Examiner*—Timothy D Collins
*Assistant Examiner*—Justin Benedik
(74) *Attorney, Agent, or Firm*—Burns & Levinson LLP; Bruce D. Jobse (57) ABSTRACT

A fixed-wing VTOL aircraft features a forward-swept wing configuration coupled with a tripod arrangement of the engines (two forward, one rear), a forward-swept empennage or tail assembly, and a forward canard. The engines and wings/empennage are located relative to each other such that the engine outlet nozzles, which pivot downwardly to provide lift-off thrust, are minimally covered by the wings/empennage, if at all. The wings and empennage may include lifting fans to supplement lift and provide pitch and/or roll control.

9 Claims, 9 Drawing Sheets

U.S. PATENT DOCUMENTS

| | | | |
|---|---|---|---|
| 5,141,176 A * | 8/1992 | Kress et al. | 244/7 C |
| D332,080 S * | 12/1992 | Sandusky et al. | D12/342 |
| 5,209,428 A | 5/1993 | Bevilaqua et al. | |
| 5,312,069 A * | 5/1994 | Bollinger et al. | 244/12.3 |
| D351,131 S * | 10/1994 | Inoue et al. | D12/331 |
| 5,405,105 A | 4/1995 | Kress | |
| 5,542,625 A * | 8/1996 | Burhans et al. | 244/45 R |
| 5,897,078 A * | 4/1999 | Burnham et al. | 244/117 R |
| 5,899,410 A * | 5/1999 | Garrett | 244/45 R |
| 5,984,231 A * | 11/1999 | Gerhardt et al. | 244/46 |
| 6,561,456 B1 * | 5/2003 | Devine | 244/12.1 |
| 6,729,575 B2 * | 5/2004 | Bevilaqua | 244/12.3 |
| D542,708 S * | 5/2007 | Lawrence et al. | D11/163 |
| 2007/0018035 A1 * | 1/2007 | Saiz et al. | 244/12.3 |

* cited by examiner

Figure 7B
In Turn, Rear Thrust Nozzle Is Horizontal

VTOL AIRCRAFT WITH FORWARD-SWEPT FIXED WING

CROSS-REFERENCE TO RELATED APPLICATIONS

This application claims priority benefit of provisional patent application Ser. No. 60/632,616 filed Dec. 2, 2004, entitled "VTOL Aircraft with Forward-Swept Fixed Wing," the contents of which are incorporated by reference.

FIELD OF THE INVENTION

The invention relates to vertical take-off and landing (VTOL) aircraft. More particularly, the invention provides a novel fixed-wing VTOL aircraft with a thrust-augmenting, electric, secondary flight control system.

BACKGROUND OF THE INVENTION

A number of configurations of fixed-wing VTOL aircraft have been proposed in the art. See, for example, U.S. Pat. Nos. 3,618,875 and 3,388,878. The aircraft in those two patents utilize several lifting fans to elevate the aircraft off the ground and separate engines for forward thrust to produce lift-generating forward air speed. The lifting fans according to both references are powered by gas bled from the thrust-producing engines using fairly complex, and therefore fairly heavy, take-off ducting. As far as I know, no aircraft according to either reference has ever been built and flown successfully.

Rather, as far as I know, only two fixed-wing VTOL aircraft have been built and flown successfully in any meaningful numbers, namely, the AV8-B/Harrier "Jumpjet" and the Lockheed-Martin X-35 "Joint Strike Fighter" (currently in development). Although those two aircraft have proven themselves successfully, they both suffer from a number of design drawbacks or sensitivities. Using the Harrier for illustration purposes, I explain these deficiencies below.

Figures 1A, 1B, 1C:
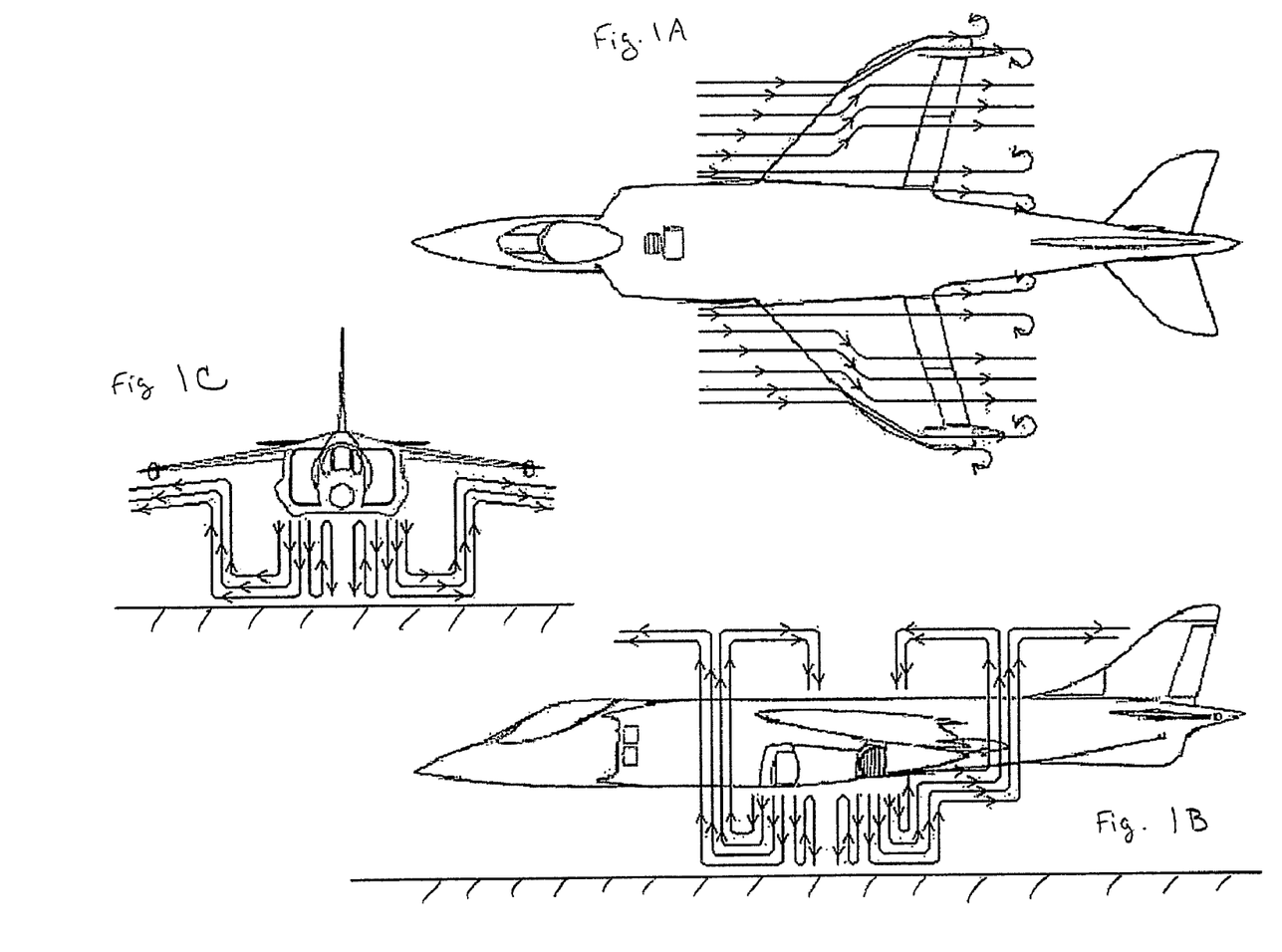
FIGS. 1A, 1B, and 1C are plan, side elevation, and front views, respectively of a conventional fixed-wing VTOL aircraft (viz. the Harrier/AV8-B)

As illustrated in FIG. 1A, at low forward velocity, airflow over the root of the wing is generally laminar. Flow over the mid-span portions of the wing, however, tends to be less stable, and flow over the tip portions of the wing becomes highly unstable to turbulent. As forward velocity increases, the region of laminar flow tends to spread or progress from the root of the wing toward the tip of the wing. The flow over the tip region of the wing, however, remains somewhat unstable. It is not until the aircraft reaches forward airspeeds on the order of 120 knots that flow along the entire span of the wing becomes laminar.

As one having skill in the art will appreciate, the greater the moment arm of the control forces that can be generated, the greater the degree of aircraft stability that can be maintained with the control forces. Therefore, because the flow over the wing of a conventional fixed-wing VTOL aircraft such as the Harrier is laminar generally only near the root of the wing in low-speed forward flight, control forces are generated only with relatively short moment arms relative to the aircraft datum center line in low-speed forward flight. Therefore, as the aircraft transitions from pure vertical take-off to forward motion, roll control is relatively "soft" or "mushy." Only after the conventional fixed-wing VTOL aircraft has attained a forward speed on the order of 70 knots will full roll controllability of the wing be realized. (To compensate for this, Harriers use a series of jet thrusters at their wingtips, which utilize bleed air from the engine; this adds complexity and weight and reduces thrusting power available for lift-off.)

In addition to the delay in achieving strong positive roll control, the configuration of a conventional fixed-wing VTOL aircraft also makes pitch control somewhat difficult. As the aircraft gains forward velocity and laminar flow progresses toward the wingtip, which is located rearward of the root, the mean aerodynamic center of pressure or center of lift progresses rearward. Because the mean aerodynamic center is located behind the center of mass of the aircraft, as the mean aerodynamic center moves rearward, it moves further away from the center of mass of the aircraft and its moment arm increases. Therefore, as the aircraft increases its forward velocity and the mean aerodynamic center moves further rearward, the pitch control surfaces have to compensate for this increased moment arm. This also increases static longitudinal instability of the aircraft. Therefore, it becomes more difficult to control the vehicle in transition from VTOL through horizontal flight through pitch control inputs.

Another phenomenon which occurs in conventional fixed-wing VTOL aircraft such as the Harrier is lift entrainment or "suck down," which is a phenomenon that occurs within about four feet to twelve feet of the ground and that is related to ground effect. In particular, in a conventional fixed-wing VTOL aircraft such as the Harrier, vertical lift-off is achieved by rotating two sets of nozzles to direct gas flow from the engine downwardly. The conventional configuration has those nozzles positioned generally right under the wings of the aircraft, as illustrated in FIGS. 1B and 1C. As further illustrated in those Figures, when the jet exhaust strikes the ground, it is diverted laterally and flows horizontally along the ground under the wings. Because the flow is hot gas, as soon as the gas is able to rise, i.e., as soon as it exits out from under the wings, it does so. Cooler, heavier air above, however, forces the flow back down on top of the wing, creating the circular flow pattern illustrated in FIG. 1B. Thus, there is increased pressure force on top of the wing, pressing the wing downward. Additionally, the horizontal, lateral flow of gas along the underside of the wing illustrated in FIG. 1C reduces pressure due to Bernoulli's principle, and that reduced pressure under the wing creates a suction force which retards vertical lift-off of the aircraft.

Thus, although the AV8-B/Harrier has been a generally successful fixed-wing VTOL program, and although the X-35 "Joint Strike Fighter" also should be a successful program, conventional fixed-wing VTOL aircraft are not without their design difficulties. As a result, they can be somewhat difficult or tricky aircraft to fly.

SUMMARY OF THE INVENTION

In a first aspect, the present invention overcomes these various issues or drawbacks of conventional fixed-wing VTOL aircraft through the use of a forward-swept wing configuration coupled with a tripod arrangement of the engines (two forward, one rear), a forward-swept empennage or tail assembly, and a forward canard. The engines and wings/empennage are located relative to each other such that the engine outlet nozzles, which pivot downwardly to provide lift-off thrust, are minimally covered by the wings/empennage, if at all. This eliminates or significantly reduces "suck-down" during lift-off. Because the tips of the forward-swept wings start to fly (i.e., generate lift) as soon as the aircraft starts to move forward, strong roll control is obtained as soon as the aircraft begins to transition out of hovering flight. Moreover, the forward-swept configuration of the main wings and their generally rearward placement along the fuselage causes the aerodynamic center of gravity (center of lift) of the wings to progress toward the aircraft center of mass instead of away from it as the aircraft transitions from hovering to forward flight. This reverses the trend experienced with conventional fixed-wing VTOL aircraft, thus increasing static longitudinal stability and increasing the effectiveness of pitch control in transition from VTOL to horizontal flight.

In another aspect, the invention features a ducted electric fan-based secondary flight control system. In particular, the invention utilizes fans in the wings and in the tail surfaces to augment lift and to provide a secondary level of pitch, yaw, and roll control.

In the disclosed embodiment, the electric fans are provided in a stacked configuration, with each wing and each tail surface having a stacked pair of fans. The lower fan in each pair is configured to provide downward-acting thrust and the upper fan in each pair is configured to provide upward acting thrust. Controlling the fans differentially between left and right sides of the aircraft permits roll control; controlling the fans differentially fore and aft permits pitch control; and controlling the fans differentially between the left and right sides in the tail surfaces (e.g., in the elevons) permits yaw control.

BRIEF DESCRIPTION OF THE DRAWINGS

These and other features of the invention will become clearer in view of the detailed description below and the drawings, in which.

DETAILED DESCRIPTION OF EMBODIMENTS

Figure 2A:
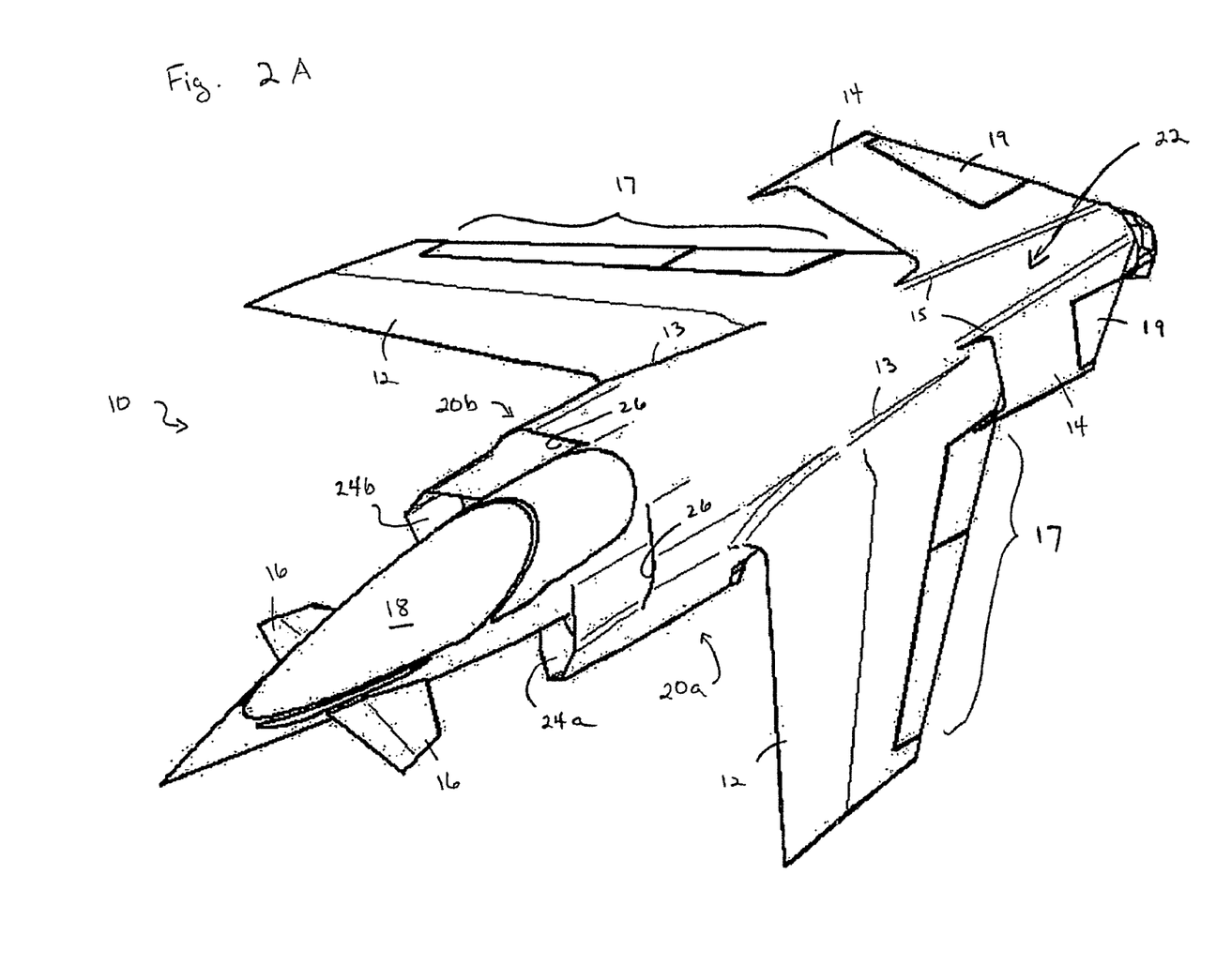
FIGS. 2A and 2B are top and bottom isometric views of a fixed-wing VTOL aircraft according to the invention.
Figure 2B:
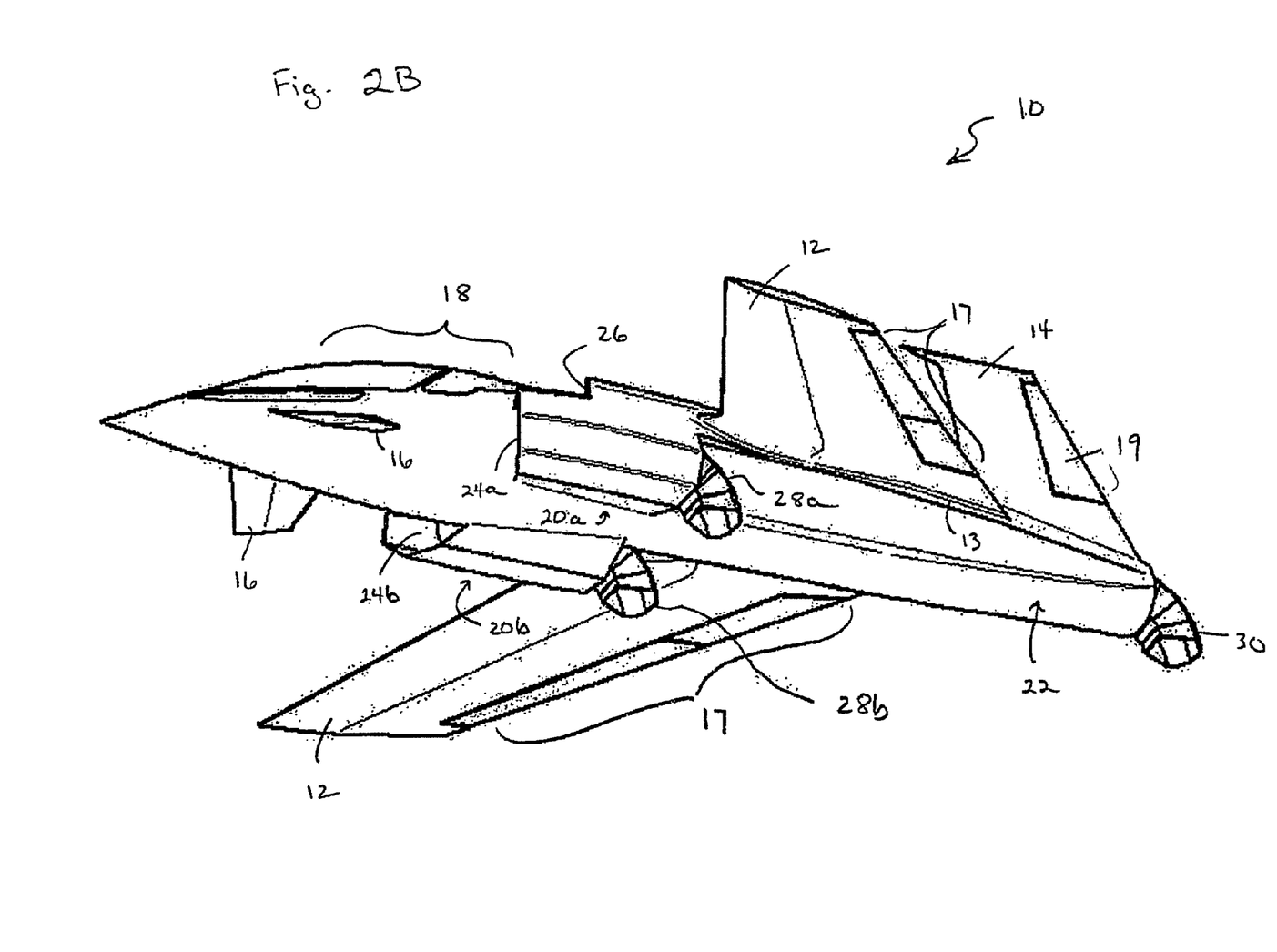

An embodiment 10 of a fixed-wing VTOL aircraft according to the invention is illustrated generally in FIGS. 2A and 2B. As illustrated in those Figures, the aircraft 10 features forward-swept main wings 12, forward-swept elevons 14 at the rear of the aircraft 10, and canards 16 at the front of the aircraft. In a manned version of the aircraft 10, the aircraft includes cockpit and crew/passenger quarters 18.

It is known that a forward swept wing configuration is inherently dynamically unstable. Therefore, the wings 12 feature a laminated composite structure that is tailored to dampen what would otherwise be aeroelastically divergent behavior of the wings, in a manner known in the art (e.g., from NASA's X-29 project). The aircraft flight control system (software, fly-by-wire hardware, and computer-controlled flight control surfaces) is also specifically tailored to accommodate the inherent or natural instability of a forward-swept wing configuration, in a manner that is also known in the art.

As further illustrated in FIGS. 2A and 2B, the main wings 12 and the elevons 14 are cooperatively positioned relative to each other such that forward portions of the elevons 14 partially overlie rearward portions of the main wings 12. In particular, the roots 13 of the main wings 12 extend rearward and the roots 15 of the elevons 14 extend forward such that approximately 18% of the main wing root chord of each wing is covered by the root chord of the corresponding elevon. This configuration fosters laminar flow over the entire span of the elevons 14—particularly over their inboard, root portions.

The wings 12 include full-span, split flaperons 17, and the elevons 14 include partial-span elevators 19. The flaperons 17 function as both ailerons (to control roll) and flaps/spoilers (to generate lift during low-speed flight; to attenuate pitch sensitivity during VTOL transition; and to trim the aircraft during supersonic flight). The elevators 19 control pitch.

The aircraft 10 further includes three integral or internally located high by-pass turbofan engines, with two engines 20a and 20b located along the left and right sides of the aircraft fuselage, respectively, at a forward position and a third engine 22 that is laterally centrally located, at the rear of the aircraft. The left, right, and rear engines 20a, 20b, and 22 have inlets 24a, 24b, and 26, respectively. Furthermore, each of the engines 20a, 20b, and 22 has a thrust-vectoring outlet nozzle 28a, 28b, and 30, respectively. The thrust-vectoring outlet nozzles 28a, 28b, and 30 are each configured to pivot vertically downward by at least 110° relative to the aircraft datum centerline (which will allow the aircraft to translate rearwardly while in VTOL mode, as illustrated in FIG. 7C) and upward by 25° relative to the aircraft datum centerline. Additionally, the engine outlet nozzles 28a, 28b, and 30 are configured to pivot laterally from side to side by 70° outboard and 45° inboard. Construction of such thrust-vectoring nozzles is deemed to be within the range of ability of someone having skill in the relevant art.

Figure 3A:
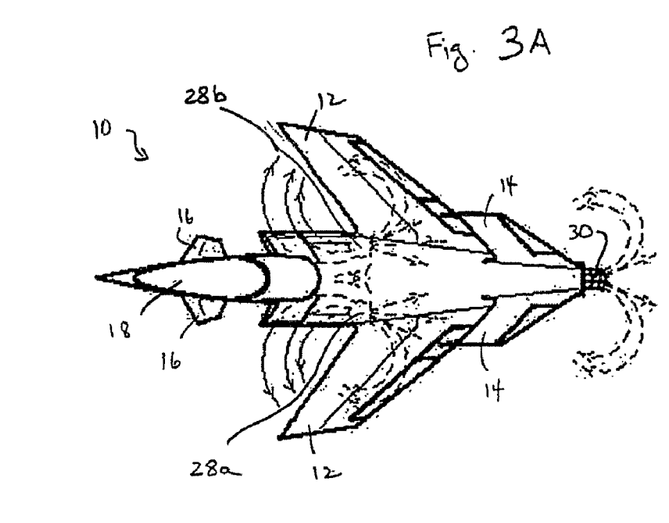
FIGS. 3A, 3B, and 3C are plan, side elevation, and front views, respectively of a fixed-wing VTOL aircraft according to the invention illustrating exhaust gas recirculation.
Figure 3B:
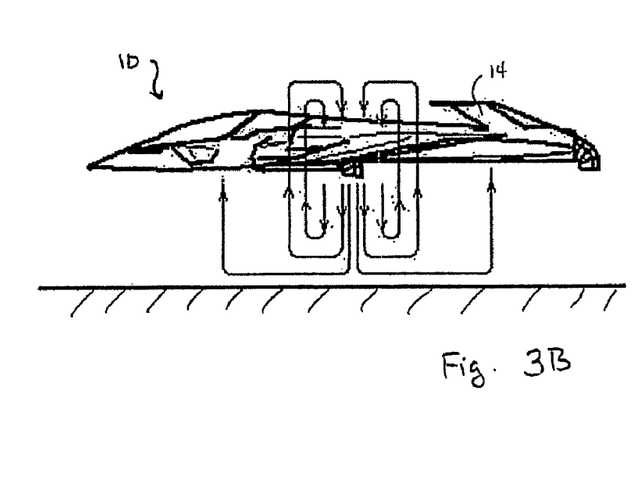
Figure 3C:
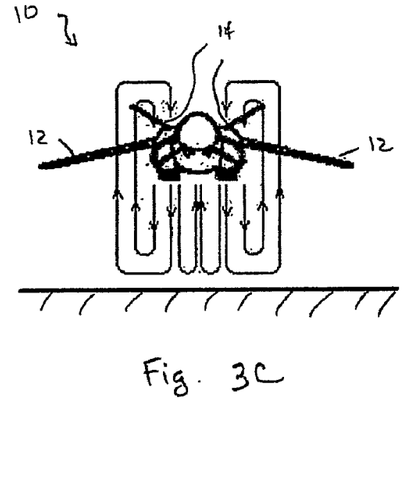

The forward engines 20a and 20b and the wings 12 are relatively positioned so that the outlet nozzles 28a and 28b are only minimally covered by the wings 12 (as viewed in plan), if at all. For example, as illustrated in FIGS. 2B and 3A, the outlet nozzles 28a and 28b may be positioned generally right at the junction between the leading edges of the wings 12 and the fuselage. As a result, the exhaust gas is generally freer to circulate in open space as illustrated in FIGS. 3B and 3C than is the case with respect to conventional fixed-wing VTOL aircraft, as illustrated in FIGS. 1B and 1C. Furthermore, because the outlet nozzles 28a and 28b and the wings 12 are cooperatively positioned so that the nozzles are only minimally covered by the wings 12, if at all, considerably less exhaust gas flows laterally beneath the wings 12 as illustrated in FIG. 3C than is the case with respect to conventional fixed-wing VTOL aircraft. Therefore, less downward force due to exhaust gas recirculation is created on the upper surfaces of the wings 12 and less downward suction force is created below the wings 12 of an aircraft according to the invention as compared to conventional fixed-wing VTOL aircraft.

As illustrated in FIGS. 3A and 3B, the forward sweep of the elevons 14 also provides clearance above the nozzle 30 of the rear engine 22. This provides the same benefit of reducing positive pressure pushing down on the elevons 14 from above and suction below the elevons 14. Thus, it is far easier for an aircraft according to the invention to lift off than it is for conventional fixed-wing VTOL aircraft to lift off.

Figure 4A:
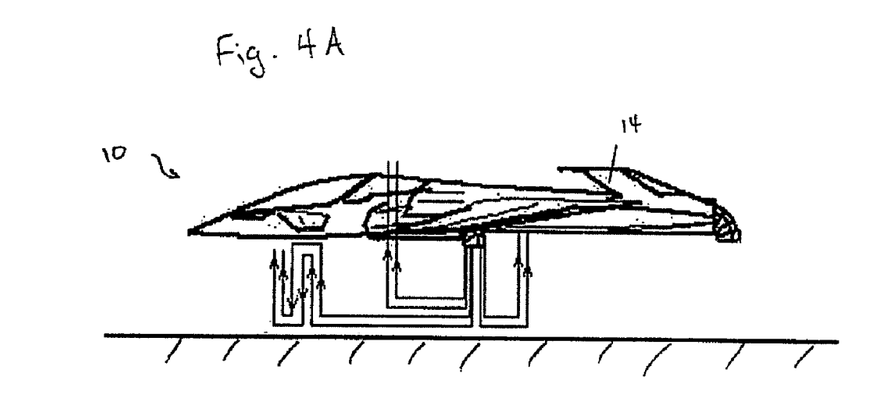
FIGS. 4A and 4B are side elevation and front views, respectively, of a fixed-wing VTOL aircraft according to the invention illustrating fountain lift airflow.
Figure 4B:
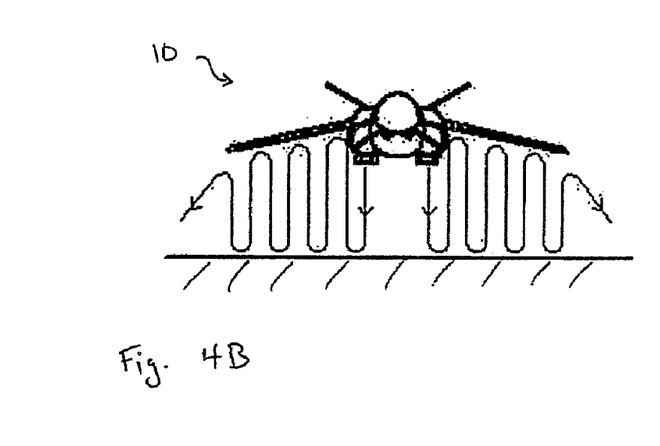

As further illustrated in FIGS. 3B, 3C, 4A, and 4B, the main wings 12 and the canards 16 both have anhedral angles, i.e., they slope downwardly from root to tip relative to the aircraft datum centerline. In the illustrated embodiment, the main wings 12 slope downwardly at an angle of 12° relative to horizontal, and the canards 16 slope downwardly at an angle of 17° relative to horizontal. This anhedral configuration helps trap a pocket of exhaust gas from the forward engines beneath both the main wings 12 and the canards 16, as illustrated in FIGS. 4A and 4B, which generates fountain lift. This fountain lift further assists with take-off and cushions the aircraft upon descent and landing.

Figure 4C:
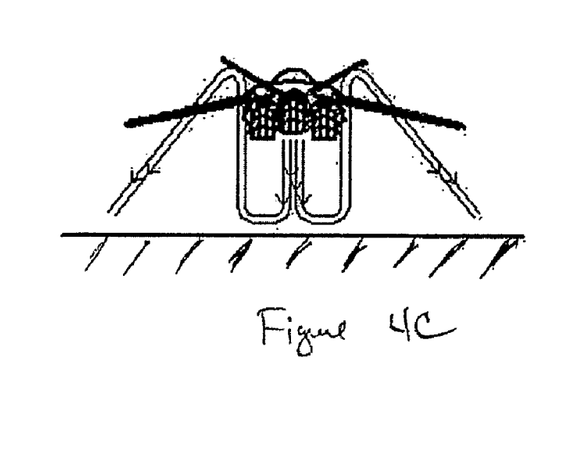
FIG. 4C is a rear view of an aircraft according to the invention illustrating yaw control-benefiting airflow.
Figures 5A, 5B, 5C, 5D, 5E:
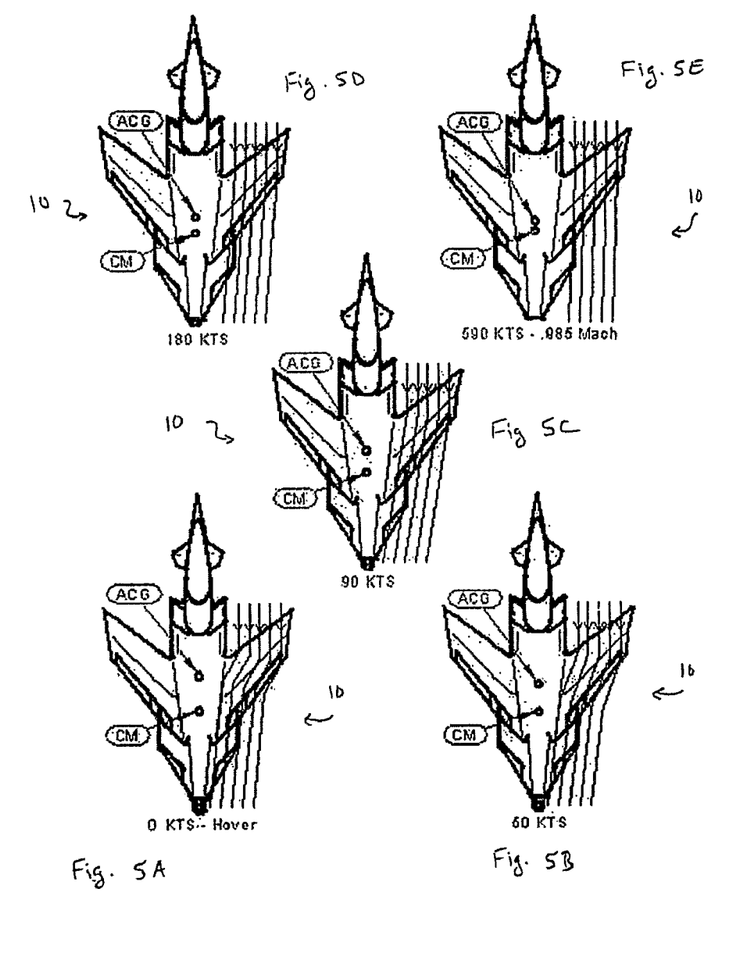
FIGS. 5A-5E are sequential plan views illustrating the progression of laminar flow over the wings of an aircraft according to the invention, from hover to 590 knots forward airspeed.
Figure 6A:
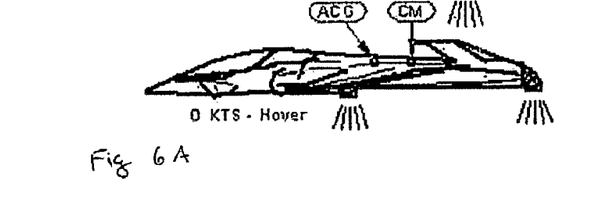
FIGS. 6A-6E are sequential side elevation views, corresponding to FIGS. 5A-5E in terms of forward airspeed, illustrating the progression of the aircraft's attitude from hover to 590 knots forward airspeed.
Figures 6B, 6C, 6D, 6E:
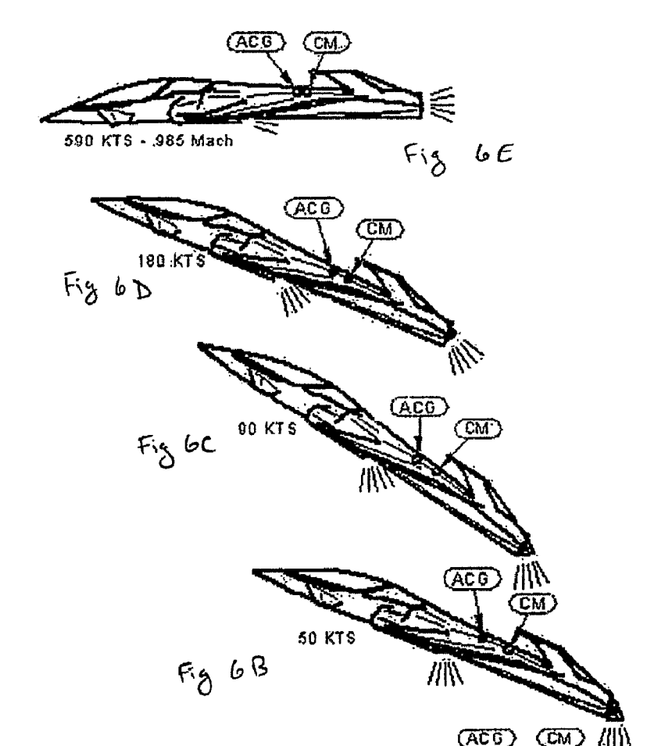

Additionally, as illustrated in FIG. 4C, the upwardly and outwardly angled nature of the elevons allows the elevons to deflect the rear jet exhaust laterally outwardly. This assists with yaw control while the aircraft 10 is in hover and in ground effect.

The forward-swept wing configuration of the aircraft 10 according to the invention provides significant advantages for a fixed-wing VTOL aircraft. In particular, as illustrated in FIG. 1A, conventional fixed-wing VTOL aircraft utilize a conventional, rearward swept wing configuration. With that configuration, the flow lines tend to be as illustrated in FIG. 1A, with airflow over the wings curving or bending to follow the rearward sweep of the wings. As noted above, however, at low forward airspeeds, the flow is generally turbulent over the outer portions of the wings; thus, strong positive roll stability is difficult to obtain at low airspeeds, i.e., the level of airspeed encountered in hover and when transitioning to forward airspeed.

With a forward-swept wing configuration, in contrast, the existence of laminar flow progresses from the tips of the wings inboard with increasing airspeed, as illustrated in FIGS. 5A through 5E. Thus, the tips of the wings "start flying" first, before the root portions of the wings. This provides an aircraft according to the invention with strong positive roll control as soon as it starts to move forward out of hovering flight. Accordingly, an aircraft according to the invention does not need to use supplemental jet thrusters at its wingtips, although such may be employed if desired.

In addition to roll control benefit, the progression of laminar flow from the wingtips inboard provides pitch control benefits as well. In particular, as forward airspeed increases and the region of laminar airflow progresses from the tip portions of the wings toward the roots of the wings, the net center of lift generated by the wings (the aerodynamic center of gravity, ACG) progresses backwards, as also illustrated in FIGS. 5A through 5E. For example, for a manned configuration that is designed to be 52 feet long, the aircraft 10 according to the invention is configured such that at 0 knots forward airspeed, the ACG is 10.5 inches ahead of the aircraft center of mass (CM), while at maximum speed of 590 knots, it is only 0.85 inch ahead of the CM. Because the ACG moves closer to the CM in an aircraft according to the invention, rather than farther away from the CM as in the case of a conventional VTOL aircraft such as the Harrier/AV8-B, pitch control, static longitudinal stability is increased, as is the effectiveness of pitch control inputs.

Figure 7A:
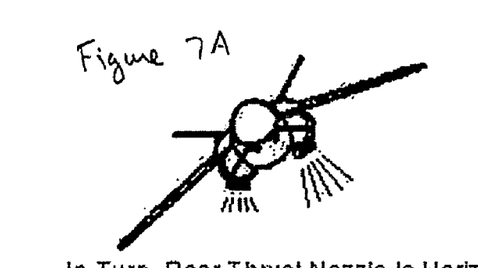
FIGS. 7A and 7B are front views illustrating turning operation of an aircraft according to the invention.
Figure 7B:
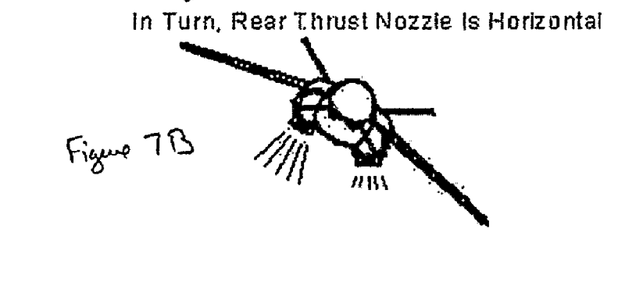
Figure 7C:
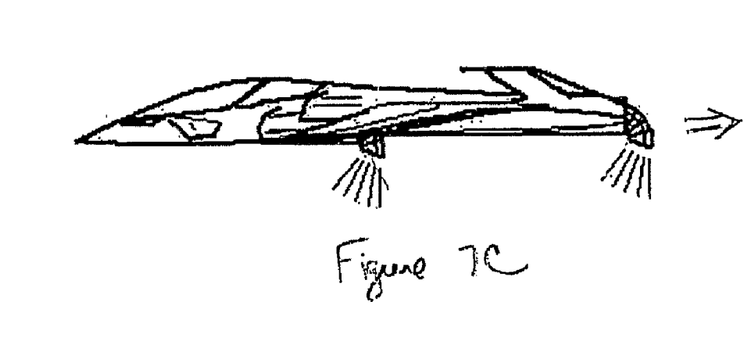
FIG. 7C is a side elevation view of an aircraft according to the invention illustrating rearward hovering translation.

Various performance capabilities of an aircraft 10 according to the invention are illustrated in FIGS. 6A-6E (which correspond to FIGS. 5A-5E in terms of forward airspeed) and FIGS. 7A and 7B. FIGS. 6A-6E illustrate the attitude of the aircraft 10 according to the invention as it transitions from hover (FIG. 6A) through increasing forward airspeed to maximum forward airspeed of 580 knots (FIG. 6E) for a manned version of the aircraft. (Unmanned versions will achieve airspeeds on the order of 1080 knots.) FIGS. 7A and 7B illustrate use of differential engine thrust between the left and right forward engines 20a, 20b, with their nozzles 28a, 28b angled slightly downward, to augment roll or turning control provided by the flaperons 17 on the wings 12 and the elevators 19 on the elevons 14.

A modified embodiment 10' of an aircraft according to the invention is illustrated in FIGS. 8, 9A, 9B, 10A, and 10B. According to this embodiment, the aircraft 10' has electric ducted fans 50 located near the tips of the main wings 12 and electric ducted fans 60 located near the tips of the elevons 14. Two stacked fans are located in each of the four lifting members (wings and elevons), with one fan on top of the other.

Figure 8:
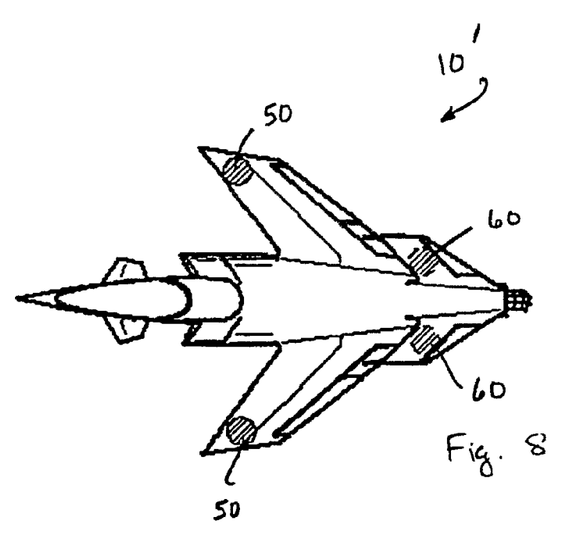
FIG. 8 is a plan view of a modified embodiment of an aircraft according to the invention.

The bottom fans in all four lifting members run in a direction so that they provide downward thrust at a minimal constant rate of 100 pounds thrust (20 amps and 125 kilowatt hours), and they can be run on an intermittent or as-needed basis at up to 600 pounds thrust in the wings (80 amps and 500 kilowatt hours) and up to 300 pounds thrust in the elevons (40 amps and 250 kilowatt hours). The top fans in each of the four lifting members run in the direction opposite to the direction in which the bottom fans run, at the same current rates, thus providing upward thrust out and away from the lifting surfaces (up to 600 pounds thrust on the main wings and up to 300 pounds thrust on the elevons).

The bottom fans are used to augment lift in VTOL and also to provide pitch and roll control in VTOL. The top fans only run when an immediate requirement is needed to counter a bottom fan in the wings for roll control or a bottom fan in the elevons for pitch control. The bottom fans, on the other hand, run constantly, thus adding to the margin of stability from lift-off to horizontal flight and improving performance.

Secondarily, the fans are integrated through the flight control computer to augment roll and pitch control. The stacked fans in the elevons control pitch and yaw. The bottom fans in the elevons, as noted, run constantly to stabilize the aircraft platform, while the top fans run intermittently, i.e., only when required, to augment pitch control. In addition, through central computing software, a bottom fan can be run on one elevon and a top fan can be run on the other elevon, thereby affecting forces in yaw and turning the aircraft around the yaw axis while in hover or VTOL. Two other opposing fans of each stack in each and opposite elevon, run at a lower power setting, to maintain pitch control and stability of the aircraft in VTOL during yaw input.

Figures 9A, 9B:
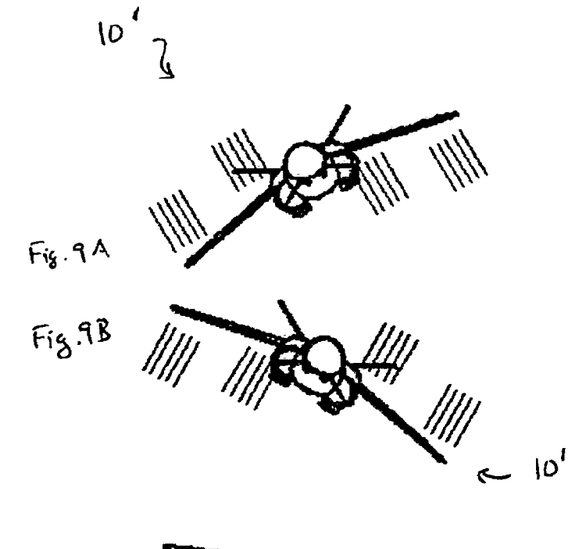
FIGS. 9A and 9B are front views of the aircraft illustrated in FIG. 8, illustrating rolling maneuvers.
Figure 10A:
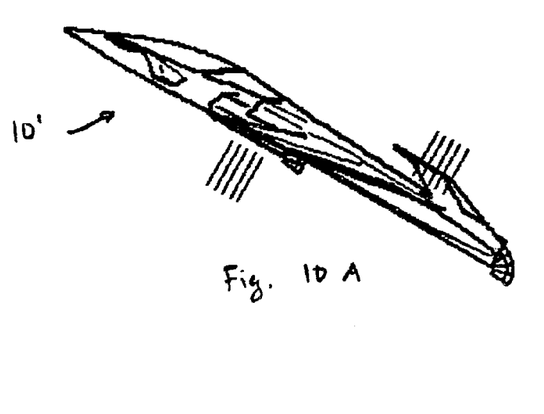
FIGS. 10A and 10B are side elevation views of the aircraft illustrated in FIG. 8, illustrating pitching maneuvers.
Figure 10B:
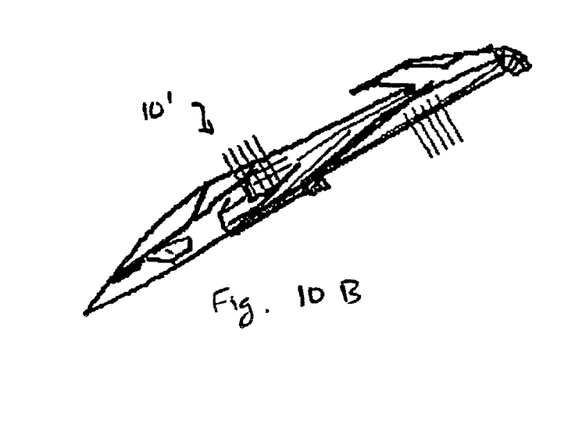

As illustrated in FIGS. 9A and 9B, by thrusting the fans (wing and/or elevon) on the left and right sides of the aircraft differentially, roll control can be effected. For example, if the bottom fan (constant operator) on the left wing is raised to 300 pounds of thrust and the top fan on the right wing (intermittent operator) is raised to 300 pounds of thrust, a sharp right turn is initiated. Alternatively, by adjusting both top wing fans to push thrust outwardly away from the top of the lifting surface, above the constant thrust level of 100 pound of the bottom wing fans and the downward thrust of the elevon bottom fans (or vice-versa), pitch control can be effected, as illustrated in FIGS. 10A and 10.

I claim:

1. A fixed-wing, vertical take-off and landing aircraft, comprising:

a fuselage;

forward-swept main wings extending from said fuselage;

an empennage at a rear portion of said fuselage, wherein said empennage comprises forward swept elevons;

thrust-providing engines configured to selectively direct their thrust downwardly for vertical take-off and landing of said aircraft and rearwardly for forward flight of said aircraft;

wherein said aircraft has three engines, two of said engines being located at a forward location with one on either side of said fuselage and the third of said engines being located at a rear portion of said fuselage, whereby said engines create a tripod of thrust when their thrust is directed downwardly.

2. The aircraft of claim 1, wherein said main wings and said forward engines are co-located with respect to each other such that said main wings substantially do not overlie outlet nozzles of said forward engines.

3. The aircraft of claim 1, wherein said main wings have a downward-sloping, anhedral configuration.

4. The aircraft of claim 1, wherein said elevons are arranged in a V-configuration and said empennage does not have a vertical stabilizer.

5. The aircraft of claim 1, wherein forward portions of roots of said elevons overlie rearward portions of roots of said main wings.

6. The aircraft of claim 1, wherein said elevons and said third, rearward engine are co-located with respect to each other such that said elevons substantially do not overlie an outlet nozzle of said rearward engine.

7. The aircraft of claim 1, further comprising canards at a forward, nose portion of the aircraft.

8. The aircraft of claim 1, further comprising fans in said wings, said fans being configured to provide thrust upwardly and downwardly.

9. The aircraft of claim 1, further comprising fans in said empennage, said fans being configured to provide thrust upwardly and downwardly.

* * * * *